(12) United States Patent
Evans et al.

(10) Patent No.: US 10,885,386 B1
(45) Date of Patent: Jan. 5, 2021

(54) SYSTEMS AND METHODS FOR AUTOMATICALLY GENERATING TRAINING IMAGE SETS FOR AN OBJECT

(71) Applicant: THE BOEING COMPANY, Chicago, IL (US)

(72) Inventors: Nick Shadbeh Evans, Lynnwood, WA (US); Eric Raymond Muir, Bothell, WA (US); Tyler C. Staudinger, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/571,533

(22) Filed: Sep. 16, 2019

(51) Int. Cl.
*G06K 9/62* (2006.01)
*G06T 11/00* (2006.01)
*G06N 20/00* (2019.01)
*G06T 19/20* (2011.01)

(52) U.S. Cl.
CPC ......... *G06K 9/6256* (2013.01); *G06K 9/6228* (2013.01); *G06N 20/00* (2019.01); *G06T 11/00* (2013.01); *G06T 19/20* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 6,400,831 B2 | 6/2002 | Lee et al. | |
| 7,043,094 B2 | 5/2006 | Thomas et al. | |
| 8,111,923 B2 | 2/2012 | Csurka et al. | |
| 9,613,149 B2 | 4/2017 | Spivack et al. | |
| 9,792,821 B1 | 10/2017 | Yalla et al. | |
| 9,838,744 B2 | 12/2017 | Moehrle | |
| 9,916,538 B2 | 3/2018 | Zadeh et al. | |
| 10,048,683 B2 | 8/2018 | Levinson et al. | |
| 10,089,742 B1 | 10/2018 | Lin et al. | |

(Continued)

FOREIGN PATENT DOCUMENTS

| | | |
|---|---|---|
| WO | 2018009405 A1 | 1/2018 |
| WO | 2018218707 A1 | 12/2018 |

OTHER PUBLICATIONS

US 10,001,775 B2, 06/2018, Levinson et al. (withdrawn)

(Continued)

*Primary Examiner* — Vu Nguyen
(74) *Attorney, Agent, or Firm* — Armstrong Teasdale LLP

(57) ABSTRACT

A computer-implemented method for generating a training image set includes retrieving, from at least one memory device, model data corresponding to a three-dimensional (3-D) model of a target object, and creating a plurality of two-dimensional (2-D) synthetic images from the model data. The 2-D synthetic images include a plurality of views of the 3-D model. The method also includes creating a plurality of semantic segmentation images by identifying a plurality of pixels that define the target object in the 2-D synthetic image, and assigning a semantic segmentation label to the identified pixels of the target object. The method further includes generating linking data associating each of the semantic segmentation labels with a corresponding one of the 2-D synthetic images, and storing the training image set including the 2-D synthetic images, the semantic segmentation labels, and the linking data.

20 Claims, 11 Drawing Sheets

(56) References Cited

U.S. PATENT DOCUMENTS

| | | |
|---|---|---|
| 10,192,117 B2 | 1/2019 | Loui et al. |
| 10,198,846 B2 | 2/2019 | Carr |
| 10,235,605 B2 | 3/2019 | Criminisi et al. |
| 2015/0138310 A1 | 5/2015 | Fan et al. |
| 2017/0123419 A1 | 5/2017 | Levinson et al. |
| 2017/0193340 A1* | 7/2017 | Shtok .................. G06T 7/75 |
| 2017/0255829 A1 | 9/2017 | Chang et al. |
| 2018/0025749 A1 | 1/2018 | Oh et al. |
| 2018/0365835 A1 | 12/2018 | Yan et al. |

OTHER PUBLICATIONS

Su, Hao, et al. "Render for cnn: Viewpoint estimation in images using cnns trained with rendered 3d model views." Proceedings of the IEEE International Conference on Computer Vision. 2015. (Year: 2015).*

"Can one use computer simulation generated data for machine learning algorithms?", (Holzner, Andre) Sep. 20, 2007, (Kadous, Waleed) Sep. 23, 2007, Quora classification: machine learning and algorithms, retrieved on Aug. 15, 2019, Retrieved from Quora using Internet <URL: https://www.quora.com/Can-one-use-computer-simulation-generated-data-for-machine-learning-algorithms >.

* cited by examiner

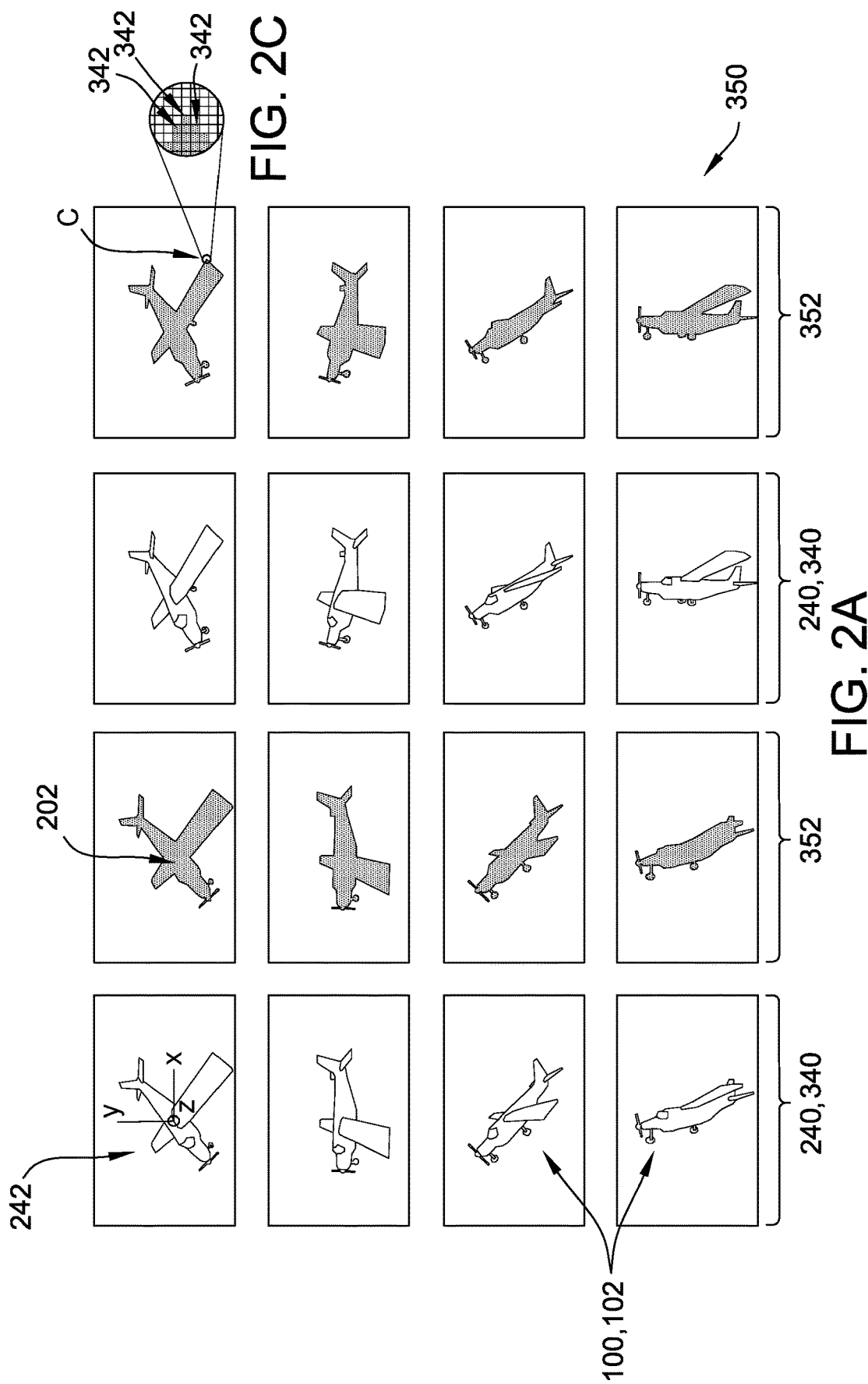

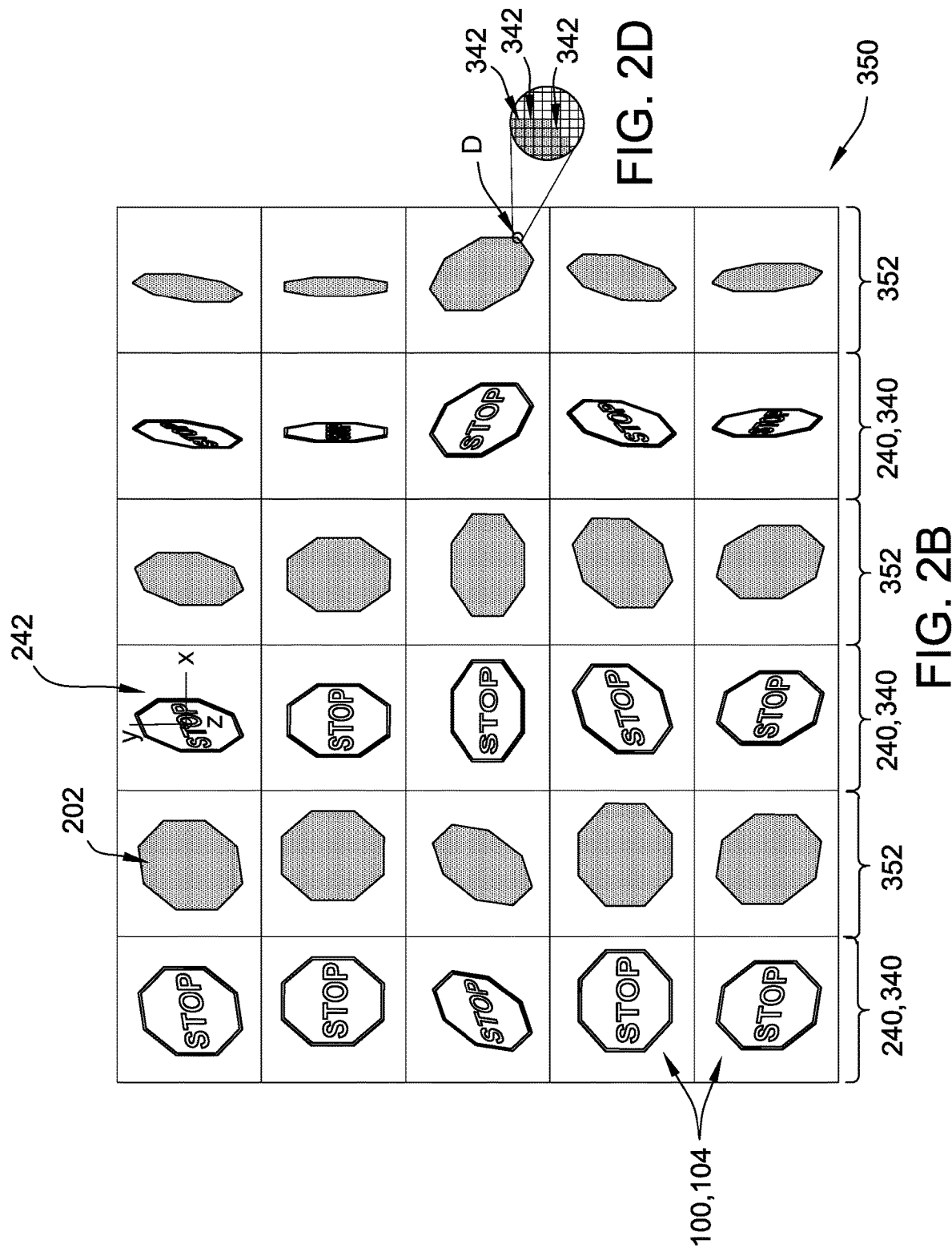

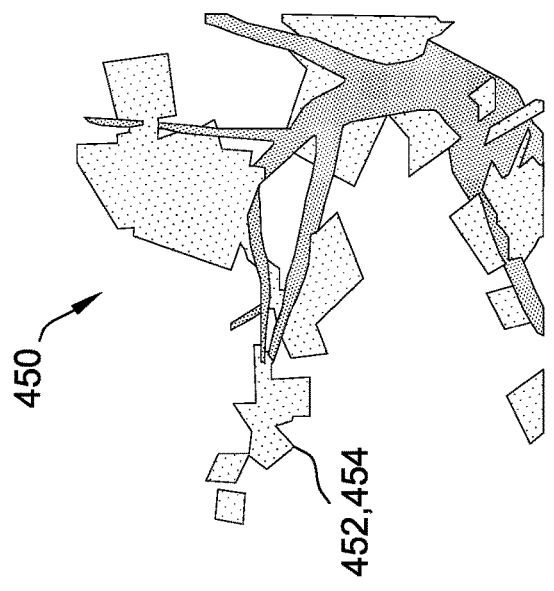
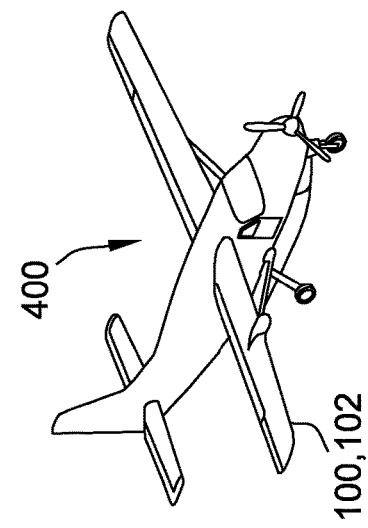
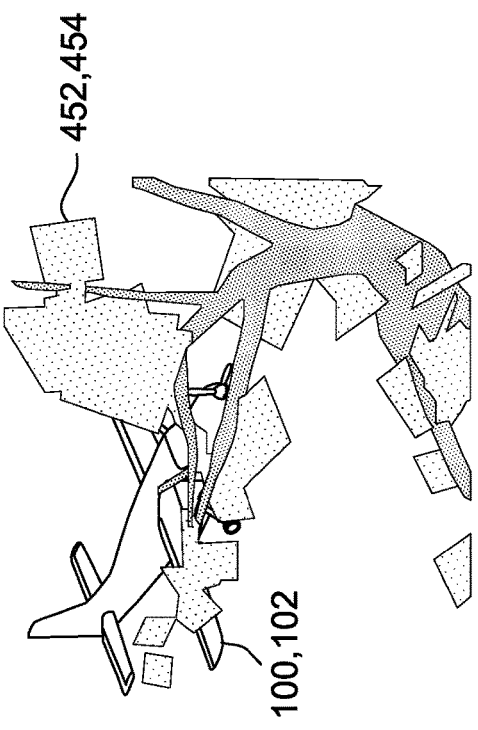
FIG. 4A
FIG. 4B
FIG. 4C

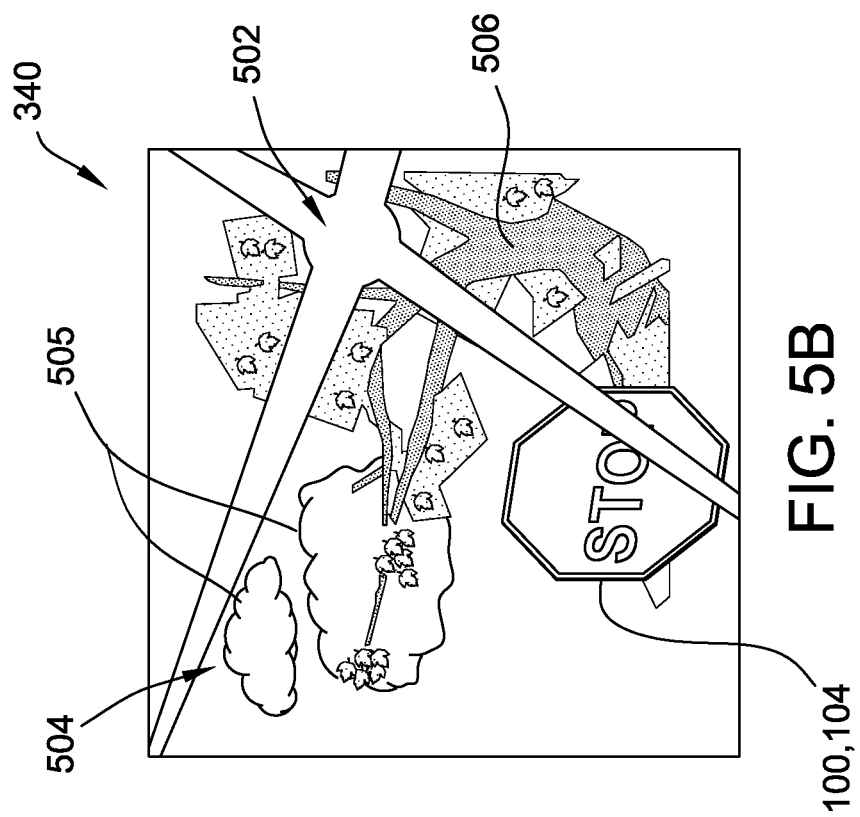
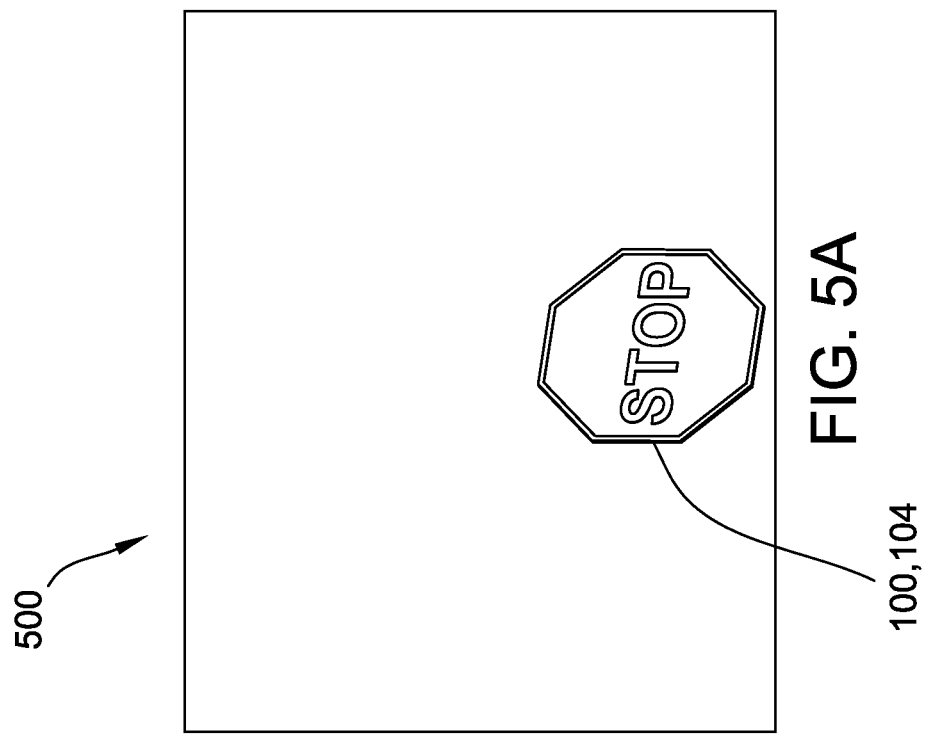
FIG. 5B
FIG. 5A

SYSTEMS AND METHODS FOR AUTOMATICALLY GENERATING TRAINING IMAGE SETS FOR AN OBJECT

FIELD

The field of the disclosure relates generally to training image sets for use in training machine vision systems to recognize objects, and more particularly to automatically generating such training image sets.

BACKGROUND

At least some known machine vision systems are trained to recognize objects detected by image sensors (e.g., detected by cameras mounted on the machine). For example, at least some known unmanned aerial vehicles ("UAVs") utilize machine vision systems trained to recognize objects relevant to autonomous navigation and/or autonomous pursuit of various mission objectives of the UAV. For another example, at least some known self-driving automotive vehicles utilize machine vision systems trained to recognize objects relevant to autonomous driving and/or autonomous pursuit of various objectives of the self-driving vehicle. Such machine vision systems are typically trained using suitable machine learning algorithms as applied to a set of training images.

Such training images typically include metadata, sometimes referred to as "labelling," to facilitate machine learning. For example, the training images may be semantically segmented to identify at least one object of interest, or "target" object, in the training image. The semantically segmented images may include a mask, such as a preselected color superimposed over each target object in each training image, to train the applied machine learning algorithm to associate the detected outline with the correct target object. The training images may also include additional labelling, such as an orientation of the target object, a configuration of the target object (e.g., if the target object is an aircraft, the configuration might include a position of the wing flaps), a presence and type of any obstruction of the view of the target object, etc.

However, to add accurate semantic segmentation labelling to the training images, each target object in an original image may require a human operator to identify the object, and masks of the appropriate colors must be manually drawn over each target object in the original image. Moreover, such a manual fit is subjective and typically not strictly accurate on a pixel-by-pixel basis; that is, each manually created mask typically includes a number of image pixels that are not part of the target object, and/or excludes a number of image pixels that are part of the target object. These pixel-level inconsistencies in the mask may ultimately limit the effectiveness of the trained system in recognizing the target object. Such operation relies on the skill of the operator and takes longer than desired.

The resulting time and effort to generate a complete set of training images can thus be quite intensive, as a very large number of training images, in some cases on the order of 10,000 to 100,000,000 training images, may be required in order to obtain robust and dependable performance in object recognition. The large number of images is required because, to ensure the trained model is robust, the set of images typically must include, for each target object, different perspectives (e.g., the target object viewed from different angles and distances), different backgrounds (e.g., the target object as it appears in different weather conditions and at different times of day), occlusions (e.g., a tree branch in front of a street sign target object), and different potential sensor effects (e.g., camera lens flare in certain lighting conditions). In many cases, obtaining initial images of the target objects relevant to a particular machine vision application under such a variety of conditions is itself a complicated and extremely time-intensive process (e.g., arranging physical camera placements to capture native images of a target object at different angles and distances, with different occlusions, under different physical lighting conditions, etc.).

BRIEF DESCRIPTION

One aspect of the present disclosure includes a method for generating a training image set. The method is implemented on a computing system including at least one processor in communication with at least one memory device. The method includes using the at least one processor to retrieve, from the at least one memory device, model data corresponding to a three-dimensional (3-D) model of a target object, and create a plurality of two-dimensional (2-D) synthetic images from the model data. The 2-D synthetic images include a plurality of views of the 3-D model. The method also includes using the at least one processor to create a plurality of semantic segmentation images by identifying a plurality of pixels that define the target object in the 2-D synthetic image, and assigning a semantic segmentation label to the identified pixels of the target object. The method further includes using the at least one processor to generate linking data associating each of the semantic segmentation labels with a corresponding one of the 2-D synthetic images, and to store the training image set including the 2-D synthetic images, the semantic segmentation labels, and the linking data.

Another aspect of the present disclosure includes a computing system for generating a training image set. The computing system includes at least one processor in communication with at least one memory device. The at least one processor is configured to retrieve, from the at least one memory device, model data corresponding to a three-dimensional (3-D) model of a target object, and create a plurality of two-dimensional (2-D) synthetic images from the model data. The 2-D synthetic images include a plurality of views of the 3-D model. The at least one processor also is configured to create a plurality of semantic segmentation images by identifying a plurality of pixels that define the target object in the 2-D synthetic images, and assigning a semantic segmentation label to the identified pixels of the target object. The at least one processor is further configured to generate linking data associating the semantic segmentation labels with a corresponding one of the 2-D synthetic images, and to store the training image set including the 2-D synthetic images, the semantic segmentation images, and the linking data.

Yet another aspect of the present disclosure includes a non-transitory computer-readable storage medium having computer-executable instructions embodied thereon for generating a training image set. When executed by at least one processor in communication with at least one memory device, the computer-executable instructions cause the at least one processor to retrieve, from the at least one memory device, model data corresponding to a three-dimensional (3-D) model of a target object, and create a plurality of two-dimensional (2-D) synthetic images from the model data. The 2-D synthetic images include a plurality of views of the 3-D model. The computer-executable instructions also cause the at least one processor to create a plurality of semantic segmentation images by identifying a plurality of pixels that define the target object in the 2-D synthetic images, and assigning a semantic segmentation label to the identified pixels of the target object. The computer-executable instructions further cause the at least one processor to generate linking data associating each of the semantic segmentation images with a corresponding one of the 2-D synthetic images, and to store the training image set including the 2-D synthetic images, the semantic segmentation images, and the linking data.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF THE DRAWINGS

FIG. 2A is a schematic representation of a portion of one example training image set for the first example target object shown in FIG. 1A, including 2-D synthetic images for a plurality of angular perspectives and corresponding semantic segmentation images for each 2-D synthetic image in accordance with an embodiment.

FIG. 2B is a schematic representation of a portion of another example training image set for the second example target object shown in FIG. 1B, including 2-D synthetic images for a plurality of angular perspectives and corresponding semantic segmentation images for each 2-D synthetic image in accordance with an embodiment.

FIG. 2C is a detail view of FIG. 2A illustrating a plurality of pixels used to build the semantic segmentation images shown in FIG. 2A in accordance with an embodiment.

FIG. 2D is a detail view of FIG. 2B illustrating a plurality of pixels used to build the semantic segmentation images shown in FIG. 2B in accordance with an embodiment.

FIG. 4A is an example of a 2-D synthetic base image that may be generated by the system shown in FIG. 3 from a three-dimensional model of a target object, such as the three-dimensional models shown in FIG. 1A and FIG. 1B in accordance with an embodiment.

FIG. 4B is an example of occlusion image data corresponding to an occluding object in accordance with an embodiment.

FIG. 4C is an example of a 2-D synthetic image that may be created by the system shown in FIG. 3 from the 2-D synthetic base image shown in FIG. 4A and the occlusion image data shown in FIG. 4B in accordance with an embodiment.

FIG. 5A is an example of another 2-D synthetic base image that may be created by the system shown in FIG. 3 from a three-dimensional model of a target object, such as the three-dimensional models shown in FIG. 1A and FIG. 1B in accordance with an embodiment.

FIG. 5B is an example of another 2-D synthetic image that may be created by the system shown in FIG. 3 from the 2-D synthetic base image shown in FIG. 5A and having a simulated extrinsic sensor effect and background added thereto in accordance with an embodiment.

Figure 1A:
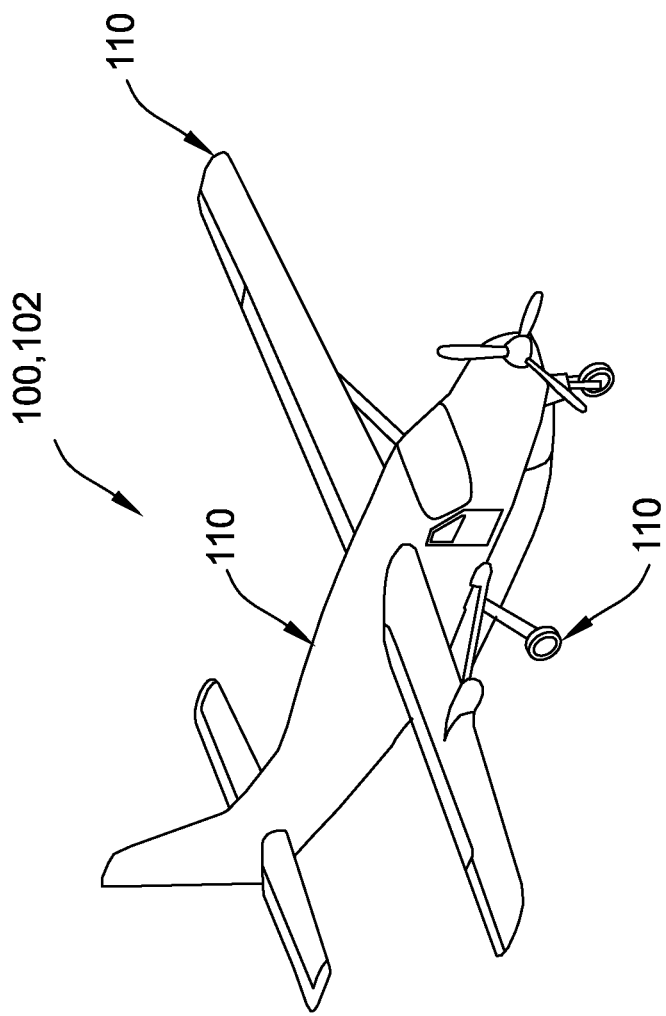
FIG. 1A is a schematic representation of a computer-generated view of a three-dimensional model of a first example target object in accordance with an embodiment.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

Examples of computer-implemented methods for generating training image sets of a target object as described herein include creating a plurality of two-dimensional (2-D) synthetic images of the target object from a plurality of perspective views of a three-dimensional (3-D) model of the target object. Simulated or "synthetic" perspective views of the target object, based on an input rotational orientation and distance for the selected viewpoint, are obtainable from the 3-D model using suitable rendering algorithms which are included in many commercially available computer-aided design products and need not be discussed in depth for purposes of this disclosure.

The examples also include, for each synthetic image, identifying a plurality of pixels that define the target object in the 2-D synthetic image, automatically building a semantic segmentation image for the 2-D synthetic image from the identified pixels, and generating linking data associating the semantic segmentation image with the corresponding 2-D synthetic image. The examples further include storing the training image set, including the 2-D synthetic images, the semantic segmentation images, and the linking data, in the memory. In other words, the plurality of 2-D synthetic images are stored as part of the training image set to be used as the native images corresponding to the semantic segmentation images during training. Accordingly, the systems and methods of the present disclosure replace the time- and resource-intensive physical camera and scene adjustments, required by prior art methods for obtaining a variegated set of native images of a target object, with high-speed, automated generation of precisely controlled synthetic images from a single 3-D object model.

In addition, because the 2-D synthetic images are cleanly generated from 3-D object models with no uncontrolled or unnecessary elements in the image, the pixels representing the target object in each 2-D synthetic image are precisely identifiable by the computing system, and a suitable algorithm can be applied by the computing system to locate the pixels that are part of the target object. The computing system automatically assigns or "fills in" a semantic segmentation label to the identified pixels, with no intervening input required from a human operator. The semantic segmentation label is, for example, a pre-selected color or other identifier of a class of objects to which the target object belongs, and accordingly is usable by the training algorithm to help the machine vision system correctly identify the target object as belonging to the class. Accordingly, the systems and methods of the present disclosure replace the painstaking manual effort and subjective judgment required by prior art methods for semantic segmentation labelling with high-speed, automated generation of semantic segmentation images that are objectively accurate on a pixel-by-pixel basis, because each semantic segmentation is grounded in the pixels of the target object in the 2-D synthetic image.

Unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1B:
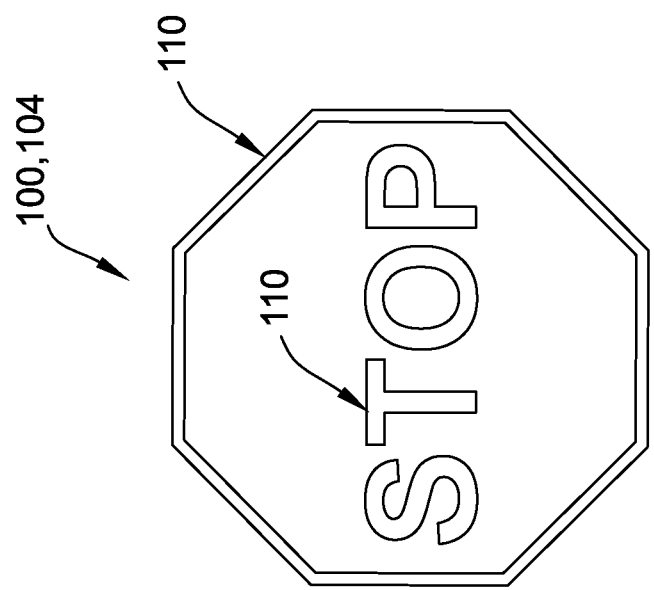
FIG. 1B is a schematic representation of a computer-generated view of a three-dimensional model of a second example target object in accordance with an embodiment.

FIG. 1A is a schematic representation of a computer-generated view of a three-dimensional model of a first example of a target object 100, and more specifically an aircraft 102. For purposes of this disclosure, a "target object" is an object which a machine vision system is to be trained to discern from a general background. In some examples, aircraft 102 is an example of target object 100 that might be encountered by an unmanned vehicle such as an unmanned aerial vehicle ("UAV") utilizing a machine vision system, such as machine vision system 362 (shown in FIG. 3). Other unmanned vehicles are also contemplated, such as land, sea, or space-based vehicles. FIG. 1B is a schematic representation of a computer-generated view of a three-dimensional model of a second example of target object 100, and more specifically a road sign 104. In some examples, road sign 104 is an example of target object 100 that might be encountered by a self-driving automotive vehicle utilizing a machine vision system, such as machine vision system 362 (shown in FIG. 3). Although target object 100 is represented herein in terms of aircraft 102 and road sign 104, it should be understood that the disclosure encompasses any target object 100 that may be relevant to machine vision system 362 in any application. For example, machine vision system 362 is used in an application other than an aerial flight environment or an automotive environment.

Figure 2E:
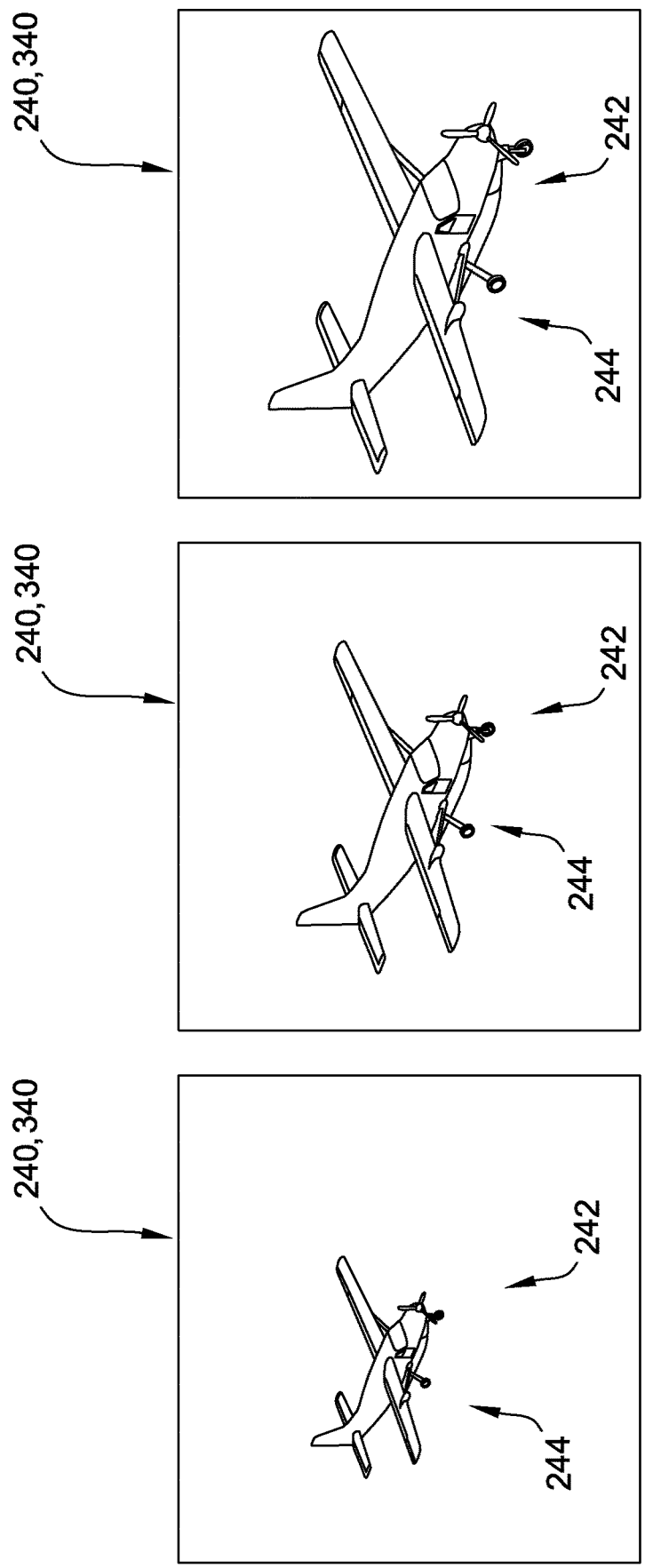
FIG. 2E is a schematic representation of a portion of the example training image set for the first example target object shown in FIG. 1A, including 2-D synthetic images for a plurality of distance perspectives in accordance with an embodiment.
Figure 3:
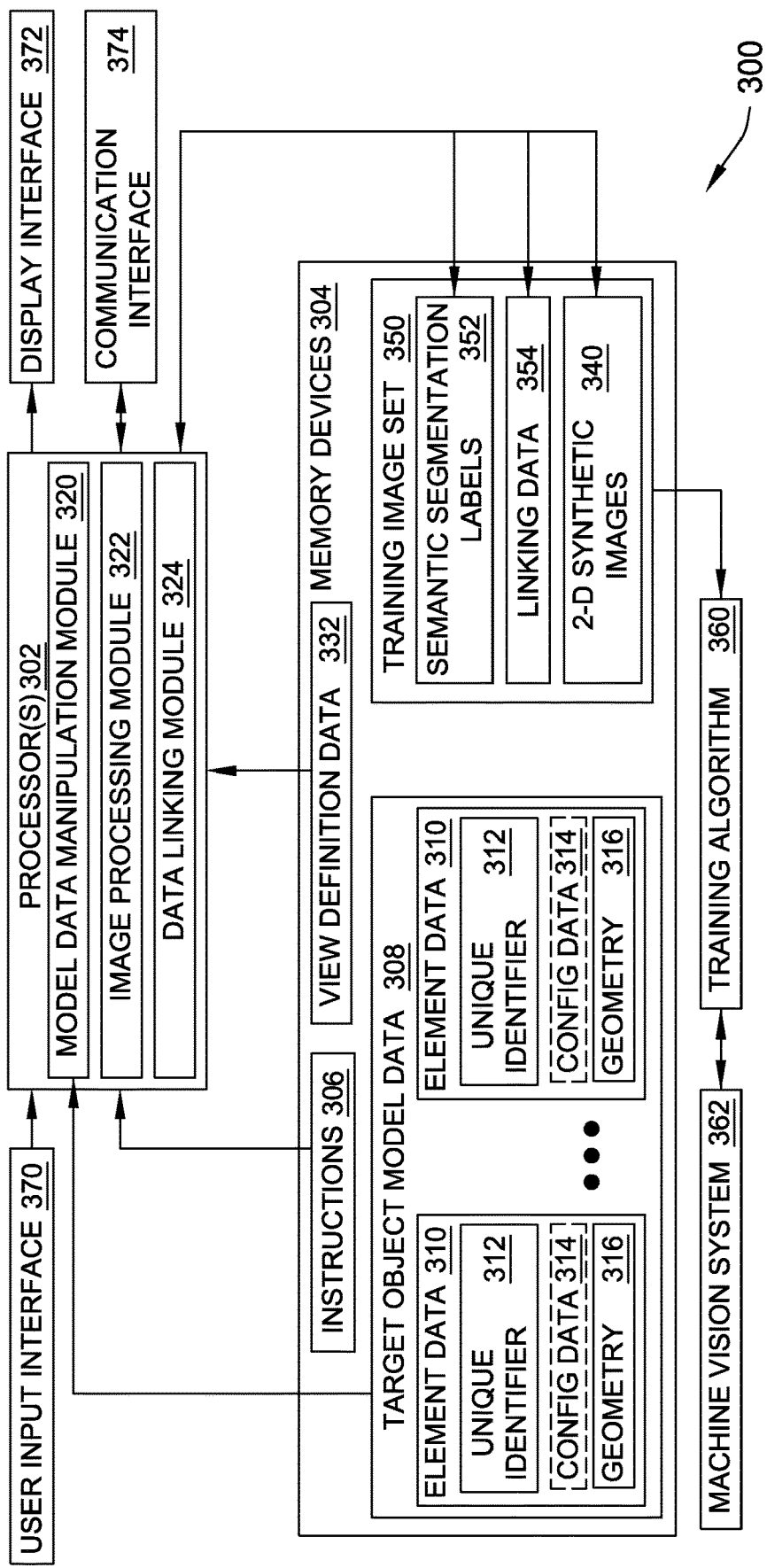
FIG. 3 is a schematic block diagram of an example of a computing system that may be used to generate a set of training images, such as the example sets shown in FIG. 2A and FIG. 2B, from a three-dimensional model, such as the three-dimensional models shown in FIG. 1A and FIG. 1B in accordance with an embodiment.

FIG. 3 is a schematic block diagram of an example computing system 300 for generating training image set 350 for target object 100. In particular, computing system 300 includes at least one processor 302 configured to generate semantic segmentation image 352 from a three-dimensional (3-D) model of target object 100. Semantic segmentation image 352 is a two-dimensional image that includes a semantic segmentation label 202 (shown in FIGS. 2A and 2B) assigned to the pixels 342 corresponding to target object 100. In the example, semantic segmentation label 202 is a preselected color assigned to the pixels 342 corresponding to target object 100.

The at least one processor 302 is configurable to perform one or more operations described herein via programming the at least one processor 302. For example, the at least one processor 302 is programmed to execute a model data manipulation module 320, an image processing module 322, a data linking module 324, and/or other suitable modules which perform steps as described below.

In the example, computing system 300 includes at least one memory device 304 operatively coupled to the at least one processor 302, and the at least one processor 302 is programmed by encoding an operation as one or more computer-executable instructions 306 and providing the computer-executable instructions 306 in the at least one memory device 304. In some examples, the computer-executable instructions are provided as a computer program product by embodying the instructions on a non-transitory computer-readable storage medium. The at least one processor 302 includes, for example and without limitation, a graphics card processor, another type of microprocessor, a microcontroller, or other equivalent processing device capable of executing commands of computer readable data or programs for executing model data manipulation module 320, image processing module 322, data linking module 324, and/or other suitable modules as described below. In some examples, the at least one processor 366 includes a plurality of processing units, for example and without limitation, coupled in a multi-core configuration. In certain examples, the at least one processor 302 includes a graphics card processor programmed to execute image processing module 322 and a general-purpose microprocessor programmed to execute model data manipulation module 320, data linking module 324, and/or other suitable modules.

In the example, the at least one memory device 304 includes one or more devices that enable storage and retrieval of information such as executable instructions and/or other data. The at least one memory device 304 includes one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are examples only, and are thus not limiting as to the types of memory usable as the at least one memory device 304. The at least one memory device 304 is configured to store, without limitation, application source code, application object code, source code portions of interest, object code portions of interest, configuration data, execution events, and/or any other type of data.

In the example, computing system 300 includes a display device 372 coupled to the at least one processor 302. Display device 372 presents information, such as a user interface, to an operator of computing system 300. In some examples, display device 372 includes a display adapter (not shown) that is coupled to a display device (not shown), such as a cathode ray tube (CRT), a liquid crystal display (LCD), an organic LED (OLED) display, and/or an "electronic ink" display. In some examples, display device 372 includes one or more display devices.

In the example, computing system 300 includes a user input interface 370. User input interface 370 is coupled to the at least one processor 302 and receives input from an operator of computing system 300. User input interface 370 includes, for example, a keyboard, a pointing device, a mouse, a stylus, a touch sensitive panel, e.g., without limitation, a touch pad or a touch screen, and/or an audio input interface, e.g., without limitation, a microphone. A single component, such as a touch screen, is capable of functioning as both display device 372 and user input interface 370.

In some examples, computing system 300 includes a communication interface 374. Communication interface 374 is coupled to the at least one processor 302 and is configured to be coupled in communication with one or more remote devices, such as but not limited to a network server, and to perform input and output operations with respect to such devices. For example, communication interface 374 includes, without limitation, a wired network adapter, a wireless network adapter, a mobile telecommunications adapter, a serial communication adapter, and/or a parallel communication adapter. Communication interface 374 receives data from and/or transmits data to the one or more remote devices for use by the at least one processor 302 and/or storage in the at least one memory device 304.

In other examples, computing system 300 is implemented in any suitable fashion that enables computing system 300 to perform the steps described herein.

With reference to FIGS. 1-3, the at least one processor 302 has access to model data 308 corresponding to the three-dimensional model of target object 100. In the example, model data 308 is stored in the at least one memory device 304, and the at least one processor 302 is programmed to retrieve model data 308 from the at least one memory device 304. For example, model data 308 is developed using a suitable computer-aided design (CAD) application and formatted as CAD data. For another example, model data 308 is developed from a physical exemplar of target object 100 using a suitable photogrammetry technique or a suitable 3-D scanning technique.

In the example, model data 308 includes element data 310 associated with at least one element 110 of target object 100. For example, elements 110 of aircraft 102 identified in FIG. 1A include a wing, a fuselage, and a landing gear, and elements 110 of road sign 104 identified in FIG. 1B include a base and a lettering. It should be understood that aircraft 102 and road sign 104 each include additional elements 110 that are not identified in FIG. 1. In the example, model data 308 includes a unique identifier 312 and a geometry 316 for each element 110 of target object 100. More specifically, unique identifier 312 for each element 110 differs from unique identifier 312 of every other element 110 included in model data 308.

Geometry 316 enables the at least one processor 302 to determine a position and orientation of the corresponding element 310 from any viewing angle and distance, such as when an image of target object 100 is rendered from model data 308. In some examples, target object 100 includes at least one element 110 that is configurable, i.e., for which geometry 316 is variable based on a configuration of the element 110. For example, for target object 100 being aircraft 102, one of elements 110 is a landing gear that may be extended or retracted. In the example, for elements 110 of target object 100 that are configurable, element data 310 includes configuration data 314, and configuration data 314 defines how geometry 316 is modified for each configuration of element 110. Alternatively, target object 100 (such as road sign 104) includes no elements 110 that are configurable, and accordingly model data 308 includes no configuration data 314.

The at least one processor 302 also is programmed to generate a plurality of views 240 of the target object 100 from the model data 308 using view definition data 332. Each view 240 of the plurality of views of target object 100 corresponds to a perspective rendering of target object 100 for a corresponding orientation of, and distance from, target object 100. In other words, the views 240 are perspectives of target object 100 for which images will be included in training image set 350 used to train machine vision system 362. More specifically, training image set 350 includes 2-D synthetic images 340 for each of the views 240 and corresponding semantic segmentation images 352, and a training algorithm 360 is programmed to use corresponding pairs of 2-D synthetic images 340, which serve the role of native "real" images, and semantic segmentation images 352 to train machine vision system 362 to recognize target object 100.

View definition data 332 defines the perspectives for each view 240 of target object 100. In the example, view definition data 332 is stored in the at least one memory device 304, and the at least one processor 302 is programmed to retrieve view definition data 332 from the at least one memory device 304. In some examples, view definition data 332 includes a predefined set of orientations and/or distances for which views 240 of target object 100 are to be generated in order to create a comprehensive training image set 350. For example, the at least one processor 302 is programmed to receive view definition data 332 as a listing of numeric values in, e.g., a text file.

For example, view definition data 332 defines a plurality of angular perspectives 242, and the at least one processor 302 is programmed to create 2-D synthetic images 340 by rotating the 3-D model of target object 100 through the plurality of angular perspectives 242 and creating one of the 2-D synthetic images at each of the plurality of angular perspectives 242. For example, as illustrated in the top left view 240 of FIG. 2A, each angular perspective 242 is defined in terms of orthogonal axes x, y, and z, based on angular rotation away from an initial, front-facing position of target object 100, by a pitch angle about the x-axis, a yaw angle about the y-axis, and a roll angle about the z-axis (the z-axis being out of the page in the view of FIG. 2A). In certain examples, view definition data 332 includes the angular perspectives 242 as sets of absolute rotational values, such as pitch, yaw, and roll, about the predefined orthogonal axes x, y, and z, and the at least one processor 302 is programmed to sequentially apply each set of values to model data 308 to generate each view 240. Alternatively, view definition data 332 includes a rotational increment for each predefined axis x, y, and z, and the at least one processor 302 is programmed to sequentially advance the view of the 3-D model by the respective rotational increments to generate each view. Although the terms "pitch," "yaw," and "roll" are typically used in aeronautical applications, angular perspectives 242 defined using these rotations about the predefined axes x, y, z are applicable to any target object 100, as shown in FIG. 2B. Alternatively, any predefined axes and/or coordinate system suitable to define plurality of angular perspectives 242 may be used.

For example, FIG. 2A is a schematic representation of a portion of one example training image set 350 for aircraft

102, and FIG. 2B is a schematic representation of a portion of another example training image set 350 for road sign 104. Each training image set 350 includes 2-D synthetic images 340 of the respective target object 100 for a plurality of views 240, each view 240 corresponding to an angular perspective 242, and corresponding semantic segmentation images 352 for each 2-D synthetic image 340. More specifically, in FIG. 2A, each 2-D synthetic image 340 is a rendering of aircraft 102 from model data 308 for aircraft 102 at a particular angular perspective 242. Similarly, in FIG. 2B, each 2-D synthetic image 340 is a rendering of road sign 104 from model data 308 for road sign 104 at a particular angular perspective 242.

For another example, view definition data 332 further defines a plurality of distance perspectives 244, and the at least one processor 302 is programmed to create 2-D synthetic images 340 by zooming the 3-D model through the plurality of distance perspectives 244 and creating one of the 2-D synthetic images 340 at each of the plurality of angular perspectives 242 for each of the distance perspectives 244. As applied to the examples described above, the training image sets 350 illustrated in FIGS. 2A and 2B would further include repeats of at least some of the illustrated angular perspectives 242 at closer and/or more distant distance perspectives 244. As one example, FIG. 2E is a schematic representation of a portion of training image set 350 for target object 100 embodied as aircraft 102, including 2-D synthetic images 340 generated for views 240 defined by a constant angular perspective 242 at a plurality of distance perspectives 244. More specifically, the three views 240 illustrated in FIG. 2E, taken from left to right, include distance perspectives 244 corresponding to progressively closer vantage points, i.e., progressively smaller distances, from the viewpoint to the target object.

In certain examples, view definition data 332 includes the distance perspectives 244 as a set of absolute distance values, and the at least one processor 302 is programmed to sequentially apply each distance value to model data 308 at each of the angular perspectives 242 to generate the views 240 for training image set 350. Alternatively, view definition data 332 includes a distance increment, and the at least one processor 302 is programmed to sequentially zoom the view of the 3-D model by the distance increment at each of the angular perspectives 242 to generate each view 240.

Alternatively, view definition data 332 defines any suitable set of views 240 of target object 100 in any suitable fashion that enables training image set 350 to function as described herein.

In the example, to create each 2-D synthetic image 340, a suitable rendering algorithm is applied to model data 308, using a corresponding view 240 defined by view definition data 332 (e.g., defined by a specific orientation of, and distance from, target object 100) as the "viewpoint" for the rendering of the model data 308. Suitable rendering algorithms, such as but not limited to ray-tracing algorithms, are known and need not be discussed in depth for purposes of this disclosure. One such ray-tracing algorithm for 3-D models is provided in the Unity Pro product sold by Unity Technologies ApS of San Francisco, Calif. In addition, a PiXYZ Software plug-in provided by Metaverse Technologies France may be used with the Unity Pro product to import model data 308 formatted as computer aided design (CAD) data.

As discussed above, prior art systems for creating a training image set would require a human operator to capture native images of a physical exemplar of target object 100, and to orchestrate a time- and resource-intensive series of physical camera placements and/or target object adjustments to obtain a variegated set of views 240 of the target object. The systems and methods of the present disclosure replace these manual efforts with high-speed, automated generation of precisely controlled 2-D synthetic images 340 from the model data 308 at any number of views 240 to use as the native images for training image set 350.

FIG. 2C is a detail view of portion C of FIG. 2A, and FIG. 2D is a detail view of portion D of FIG. 2B, each illustrating a plurality of pixels 342 used to build semantic segmentation images 352. In the example, the process of creating semantic segmentation images 352 includes using the at least one processor 302 to identify pixels 342 that define target object 100 in 2-D synthetic image 340. For example, in the course of generating 2-D synthetic image 340 for a particular view 240, image processing module 322 applies the rendering algorithm to model data 308. Properly rendering the view 240 requires image processing module 322 to identify all pixels 342 showing any portion of target object 100. To create semantic segmentation image 352, the at least one processor is programmed to automatically assign a semantic segmentation label 202, such as a pre-selected color, to the pixels 342 of target object 100 identified by image processing module 322.

Semantic segmentation label 202 is associated in training algorithm 360 with a corresponding class of objects. For example, training algorithm 360 is programmed to associate bright red with the class "aircraft," and in the example illustrated in FIG. 2A, the at least one processor 302 assigns the semantic segmentation label 202 as the color of bright red to pixels 342 corresponding to aircraft 102 to create semantic segmentation images 352. Additionally or alternatively, the at least one processor 302 is programmed to assign any other suitable semantic segmentation label to identified pixels 342, such as a coded class identifier other than a preselected color, that enables training set 350 to function as described herein.

In the example, after the pixels 342 in 2-D synthetic image 340 are suitably modified to create semantic segmentation image 352, semantic segmentation image 352 is stored as a portable network graphic (PNG) image file in the at least one memory device 304. Alternatively, semantic segmentation image 352 is stored in any suitable format that enables training image set 350 to function as described herein.

In some examples, the process of creating semantic segmentation images 352 includes the at least one processor 302 identifying pixels 342 along a boundary of target object 100. Boundary pixels are pixels 342 of target object 100 adjacent to any pixel that is not part of target object 100, or that lie on an edge of 2-D synthetic image 340. In other words, for 2-D synthetic images 340 in which target object 100 extends partially beyond the edge of the rendered image, boundary pixels 342 are defined to include pixels 342 of target object 100 along the edge of the rendered image. The at least one processor 302 is programmed to "fill in" the pixels 342 in 2-D synthetic image 340 that are enclosed by the boundary pixels. Alternatively, the pixels 342 of target object 100 in 2-D synthetic image 340 are identified in any suitable fashion to create semantic segmentation image 352.

Because the at least one processor 302 automatically determines pixels 342 within target object 100 from the rendering of 2-D synthetic image 340, and automatically colors the set of pixels 342 with the preselected color 202, computing system 300 generates semantic segmentation images 352 having pixel-level accuracy in a high-speed process that reduces (e.g., eliminates) manual study or manipulation of acquired images.

As discussed above, in some examples, target object 100 includes at least one element 110 that is presentable in a plurality of configurations, and the corresponding element data 110 of model data 308 includes configuration data 314 representative of each of the configurations. The at least one processor 302 is programmed to create 2-D synthetic images 340 by selectively applying, to the 3-D model, the configuration data 314 for each of the configurations, and creating 2-D synthetic images 340 for each of the views 240 for each of the configurations. For example, if model data 308 for aircraft 102 includes configuration data 314 for element 110 being a landing gear, then in the example training image set 350 of FIG. 2A, the illustrated pairs of 2-D synthetic images 340 and semantic segmentation images 352 having the landing gear extended would be repeated with the landing gear retracted.

The process of generating training image set 350 further includes using the at least one processor 302 to generate linking data associating each semantic segmentation image 352 with the corresponding 2-D synthetic image 340. In the example, the at least one processor 302 generates the linking data by including at least a portion of a file name of the corresponding 2-D synthetic image 340 in a file name of a file containing the semantic segmentation image 352. For example, the matching portion of the file names includes the angles of orientation and/or distance of the view 240 for which the 2-D synthetic image 340 and semantic segmentation image 352 are generated. Alternatively, the at least one processor 302 generates the linking data by including such linking information in the respective file headers or other metadata of the corresponding 2-D synthetic image 340 and semantic segmentation image 352. Training algorithm 360 is configured to parse training image set 350 for corresponding pairs of 2-D synthetic images 340 and semantic segmentation images 352 by comparing the respective file names, file headers, and/or other metadata.

Alternatively, the at least one processor 302 generates the linking data as a separate data structure that includes information (e.g., file path, memory location) sufficient to identify locations where corresponding pairs of 2-D synthetic images 340 and semantic segmentation images 352 are located. For example, the data structure is a comma separated value (CSV) file or a table in a database. Training algorithm 360 is configured to parse training image set 350 for corresponding pairs of 2-D synthetic images 340 and semantic segmentation images 352 by parsing records in the data structure for the linking information.

Alternatively, the at least one processor 302 generates linking data associating each semantic segmentation image 352 with the corresponding 2-D synthetic image 340 in any suitable fashion that enables training image set 350 to function as described herein.

FIG. 4A is an example of a 2-D synthetic base image 400 created from model data 308 and view definition data 332. FIG. 4B is an example of occlusion image data 450 corresponding to an occluding object 452. FIG. 4C is an example of 2-D synthetic image 340, designated 2-D synthetic image 440, created from 2-D synthetic base image 400 and occlusion image data 450. In the example of FIG. 4, target object 100 is aircraft 102 and occlusion image data 450 corresponds to occluding object 452 being a tree branch 454.

An occluding object 452 is any object that partially blocks or "occludes" the view of target object 100. As noted above, in some examples machine vision system 362 may need to recognize target object 100 even when target object 100 is partially obstructed or occluded by another object. Accordingly, training image set 350 may be generated to include some views 240 in which target object 100 appears to be occluded by an occluding object 452. In some examples, the at least one processor 302 is programmed to store occlusion image data 450 in the at least one memory device 304, and to retrieve occlusion image data 450 for use in creating 2-D synthetic images 340 having partially blocked views 240 of target object 100. More specifically, the at least one processor 302 creates a plurality of 2-D synthetic base images 400 each corresponding to one of the plurality of views 240 of the 3-D model defined by view definition data 332, in the same fashion as described above with respect to 2-D synthetic images 340 having unobstructed/unaltered views. In certain examples, 2-D synthetic base images 400 also serve as 2-D synthetic images 340 having an unobstructed/unaltered view 240 of target object 100, in addition to being used for creating additional 2-D synthetic images 340 having obstructed or otherwise altered views 240 of target object 100.

The at least one processor 302 creates 2-D synthetic images 340 having occluded views 240 of target object 100 by superimposing occlusion image data 450 over each of the 2-D synthetic base images 400. For example, as shown in FIG. 4C, tree branch 454 is superimposed over aircraft 102, simulating an occluded or obstructed view 240 of aircraft 102 from behind a tree. In the same fashion, semantic segmentation images 352 for the obstructed-view 2-D synthetic images 340 also may be created by superimposing occlusion image data 450 over semantic segmentation images 352 created from 2-D synthetic base images 400. Thus, computer system 300 enables automated creation of training image set 350 including obstructed views 240 of target object 100 based on any number of the views 240 defined by view definition data 332, without the time-intensive and difficult task of arranging physical camera placements to capture native occluded images of a target object at different angles and distances.

FIG. 5A is an example of another 2-D synthetic base image 500 created from model data 308 and view definition data 332 as discussed above. FIG. 5B is an example of 2-D synthetic image 340 created from 2-D synthetic base image 500 and having a simulated extrinsic sensor effect 502 and background 504 added thereto.

In some cases, the images machine vision system 362 sees in the field through its one or more cameras vary based on background aspects, such as weather or time of day (e.g., bright sunlight or cloudy, low light). Presentation of training images with a single, consistent background could potentially degrade the effectiveness of training image set 350 in some cases. In some examples, the at least one processor 302 is further programmed to create 2-D synthetic images 340 having one or more simulated backgrounds 504 for at least some views 240 of target object 100. The simulated backgrounds 504 may each correspond to, for example, a landscape (e.g., urban or rural), a time of day, and/or a weather condition, for example. The example background 504 illustrated in FIG. 5B includes a leafy tree 506 extending from a tree-trunk positioned along a right-hand side of the 2-D synthetic image 340, and two cumulus clouds 505 in an upper left quadrant of the 2-D synthetic image 340.

More specifically, the at least one processor 302 is programmed to create a plurality of 2-D synthetic base images 500 each corresponding to one of the views 240 from view definition data 332, and then superimpose each 2-D synthetic base image 500 over different backgrounds 504 to create 2-D synthetic images 340. For example, 2-D synthetic base images 500 are created from model data 308 at various views 240 defined by view definition data 332, e.g. using a suitable ray-tracing algorithm as discussed above, and each 2-D synthetic base image 500 is superimposed over each different background 504 to generate a corresponding 2-D synthetic image 340 or each background 504. Accordingly, computing system 300 enables generation of a set of training images of target object 100 under a variety of environmental conditions without any need to wait for or rely on physical background scene adjustments.

In the example, the at least one processor 302 identifies portions of 2-D synthetic base images 500 not corresponding to target object 100, flags those portions for deletion in favor of the pixels of background 504 when 2-D synthetic base images 500 are superimposed over background 504 (e.g., the at least one processor 302 treats those portions as a "green screen"), and superimposes the modified 2-D synthetic base image 500 over background 504 to create the corresponding 2-D synthetic image 340. For example, FIG. 5B illustrates the 2-D synthetic base image 500 from FIG. 5A, in which target object 100 is road sign 104, superimposed over the example background 504 including tree 506 and clouds 505.

Additionally or alternatively, a lighting effect algorithm is applied to 2-D synthetic base images 500 to create 2-D synthetic images 340 corresponding to particular times of day or other ambient light conditions in which target object 100 may be viewed. Alternatively, the at least one processor 302 is programmed to create 2-D synthetic images 340 having backgrounds 504 from 2-D synthetic base images 500 in any suitable fashion that enables training image set 350 to function as described herein, or is not programmed to include backgrounds 504.

In some cases, the images machine vision system 362 sees in the field through its one or more cameras vary based on extrinsic sensor effects (i.e., camera effects induced by the environment), such as lens flare caused by sunlight, distortion caused by rain drops on a camera lens, etc. Presentation of training images that do not account for extrinsic sensor effects could potentially degrade the effectiveness of training image set 350 in some cases. In some examples, the at least one processor 302 is programmed to apply at least one simulated extrinsic sensor effect 502 to 2-D synthetic base images 500 to create at least some 2-D synthetic images 340. In other words, the at least one processor 302 is programmed to intentionally distort a non-distorted synthetic image to simulate real-world environmental sensor effects.

More specifically, the at least one processor 302 is programmed to create 2-D synthetic base images 500 from view definition data 332, as discussed above, and then apply simulated extrinsic sensor effects 502 to 2-D synthetic base images 500 to create one or more 2-D synthetic images 340 from each 2-D synthetic base image 500. For example, simulated extrinsic sensor effects 502 are generated by applying corresponding extrinsic sensor effect algorithms to 2-D synthetic base images 500. In the example illustrated in FIG. 5B, a "lens flare" extrinsic sensor effect 502 is added to 2-D synthetic base image 500 shown in FIG. 5A, and is created by a lighting modification algorithm propagated from a point near an upper right-hand corner of 2-D synthetic base image 500. In the example, in combination with background 504, extrinsic sensor effect 502 simulates the effect of direct sunlight shining through branches of tree 506 into a camera lens. For another example, a raindrop algorithm simulates a rain drop on a camera lens by applying a localized distortion to one or more random locations on 2-D synthetic base image 500 to create a corresponding 2-D synthetic image 340. Alternatively, the at least one processor 302 is programmed to account for such extrinsic sensor effects in creating 2-D synthetic images 340 in any suitable fashion that enables training image set 350 to function as described herein, or is not programmed to account for extrinsic sensor effects 502.

Figure 6A:
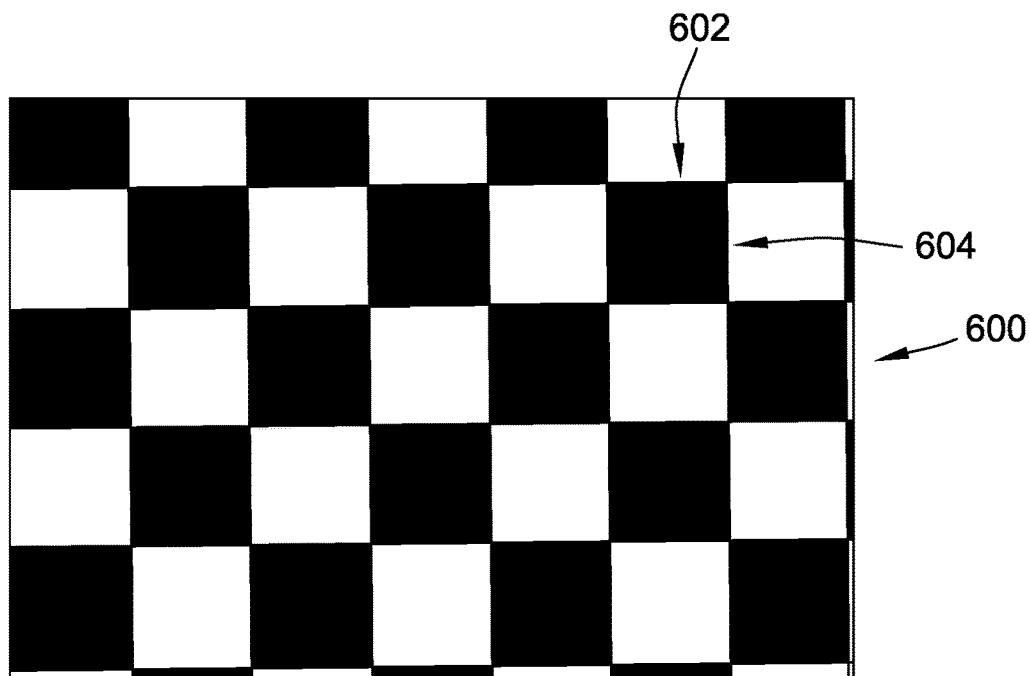
FIG. 6A is an example of a physical test pattern that may be viewed by a camera used by a machine vision system in accordance with an embodiment.
Figure 6B:
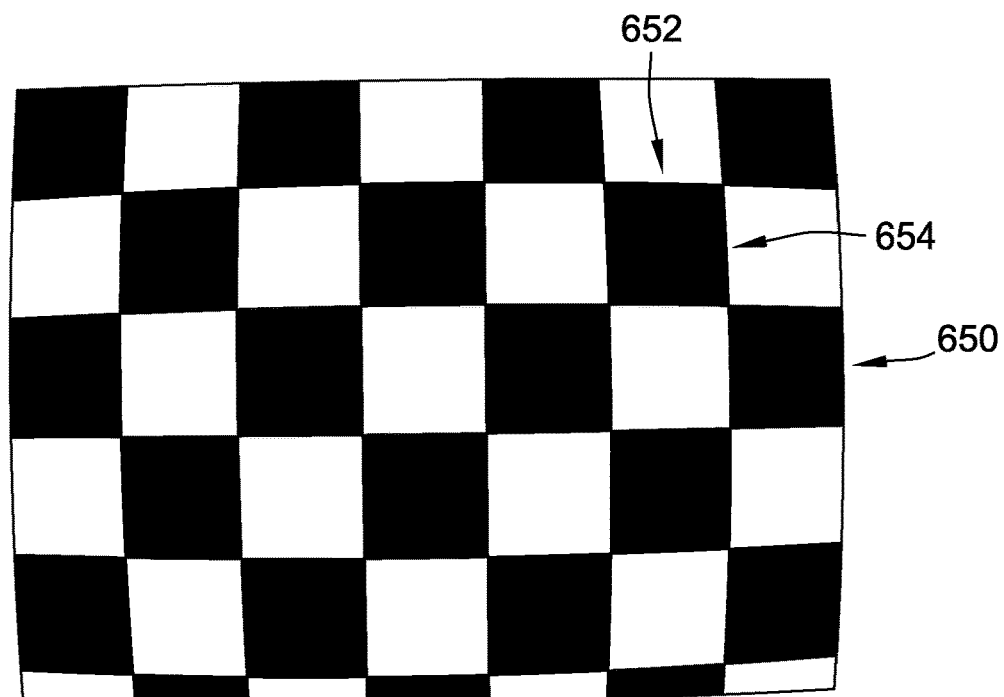
FIG. 6B is an example of an acquired image of the physical test pattern shown in FIG. 6A as acquired by the camera in accordance with an embodiment.

Similarly, in some examples, the at least one processor 302 is further programmed to apply simulated intrinsic sensor effects in 2-D synthetic images 340. FIG. 6A is an example of a physical test pattern 600 that may be viewed by a camera used by machine vision system 362. FIG. 6B is an example of an acquired image 650 of physical test pattern 600 acquired by the camera. Physical test pattern 600 is a checkerboard pattern defined by straight horizontal lines 602 and straight vertical lines 604. However, due to intrinsic sensor effects of the camera, acquired image 650 of physical test pattern 600 is warped, such that straight horizontal lines 602 become curved horizontal lines 652 and straight vertical lines 604 become warped vertical lines 654. In an absence of further modification, 2-D synthetic images 340 generated from model data 308 using, for example, a ray-tracing algorithm do not include warping caused by intrinsic sensor effects such as that illustrated in acquired image 650. In certain examples, this could lead to a mismatch between 2-D synthetic images 340 and semantic segmentation images 352 in training image set 350, on the one hand, and the images machine vision system 362 sees in the field through its one or more cameras, which would potentially degrade the effectiveness of training image set 350.

In the example, the at least one processor 302 is programmed to account for such intrinsic sensor effects in creating 2-D synthetic images 340. In other words, the at least one processor 302 is programmed to intentionally distort a non-distorted synthetic image. More specifically, the at least one processor 302 is programmed to create 2-D synthetic base images 500 from view definition data 332, as discussed above, and then apply simulated intrinsic sensor effects to the 2-D synthetic base images to create 2-D synthetic images 340. For example, the 2-D synthetic base images are created from model data 308 at views 240 defined by view definition data 332, e.g. using a suitable ray-tracing algorithm as discussed above, and then an intrinsic sensor effect mapping algorithm is applied to the 2-D synthetic base images to generate 2-D synthetic images 340.

For example, one such intrinsic sensor effect mapping algorithm is to map x- and y-coordinates of each 2-D synthetic base image to xd- and yd-coordinates to generate the corresponding 2-D synthetic image 340 according to the formulae:

$$xd = x(1 + k1r2 + k2r4); \text{ and}$$

$$yd = y(1 + k1r2 + k2r4);$$

where r=radius to point (x, y) from a center of the 2-D synthetic base image.

Factors k1 and k2 are determined for a particular camera by, for example, comparing acquired image 650 captured by the camera to physical test pattern 600. For a camera having a fish-eye lens, a further factor k3 also may be determined and applied using a suitable extended mapping. Alternatively, the at least one processor 302 is programmed to account for such intrinsic sensor effects in creating 2-D synthetic images 340 in any suitable fashion that enables training image set 350 to function as described herein, or is not programmed to include intrinsic sensor effects.

Additionally or alternatively, the at least one processor 302 is programmed to apply any suitable additional processing in creating and/or processing 2-D synthetic images 340 and/or semantic segmentation images 352. For example, at least some known examples of training algorithm 360 perform better on training image sets 350 having a relatively low image resolution. The at least one processor 302 may be programmed to reduce an image resolution of 2-D synthetic images 340 prior to storing in training image set 350, and to semantic segmentation images 352 having a corresponding reduced image resolution. For another example, at least some known examples of training algorithm 360 perform better on training image sets 350 that do not include large swaths of unsegmented background image. The at least one processor 302 may be programmed to crop 2-D synthetic images 340 prior to storing in training image set 350, and to correspondingly crop semantic segmentation images 352.

In some examples, the at least one processor 302 is programmed to create at least one additional label for each of 2-D synthetic images 340. For example, the at least one additional label includes a perspective label corresponding to a perspective, e.g., angular rotation and/or distance, of the corresponding one of the views 240 of the 3-D model used to create the 2-D synthetic image 340. For another example, the at least one additional label includes a background label corresponding to one of a plurality of backgrounds 504 used to create the 2-D synthetic image 340. For another example, the at least one additional label includes an occlusion label corresponding to occluding object 452 for which occlusion image data 450 is included in the 2-D synthetic image 340. Additionally or alternatively, the at least one additional label includes any suitable identifier of the characteristics of, or data used to create, the corresponding 2-D synthetic image 340. The at least one processor 302 is programmed to generate additional linking data associating the at least one additional label with the corresponding 2-D synthetic image 340, and store, in the at least one memory device 304, the additional linking data as a portion of training image set 350. In certain embodiments, the additional linking data is an inclusion of the at least one additional label in at least one of a file name and a file header of the corresponding 2-D synthetic image 340. Alternatively, the additional linking data is an inclusion of the at least one additional label in other metadata of 2-D synthetic image 340, or in a separate data structure used to provide linking data.

Figure 7A:
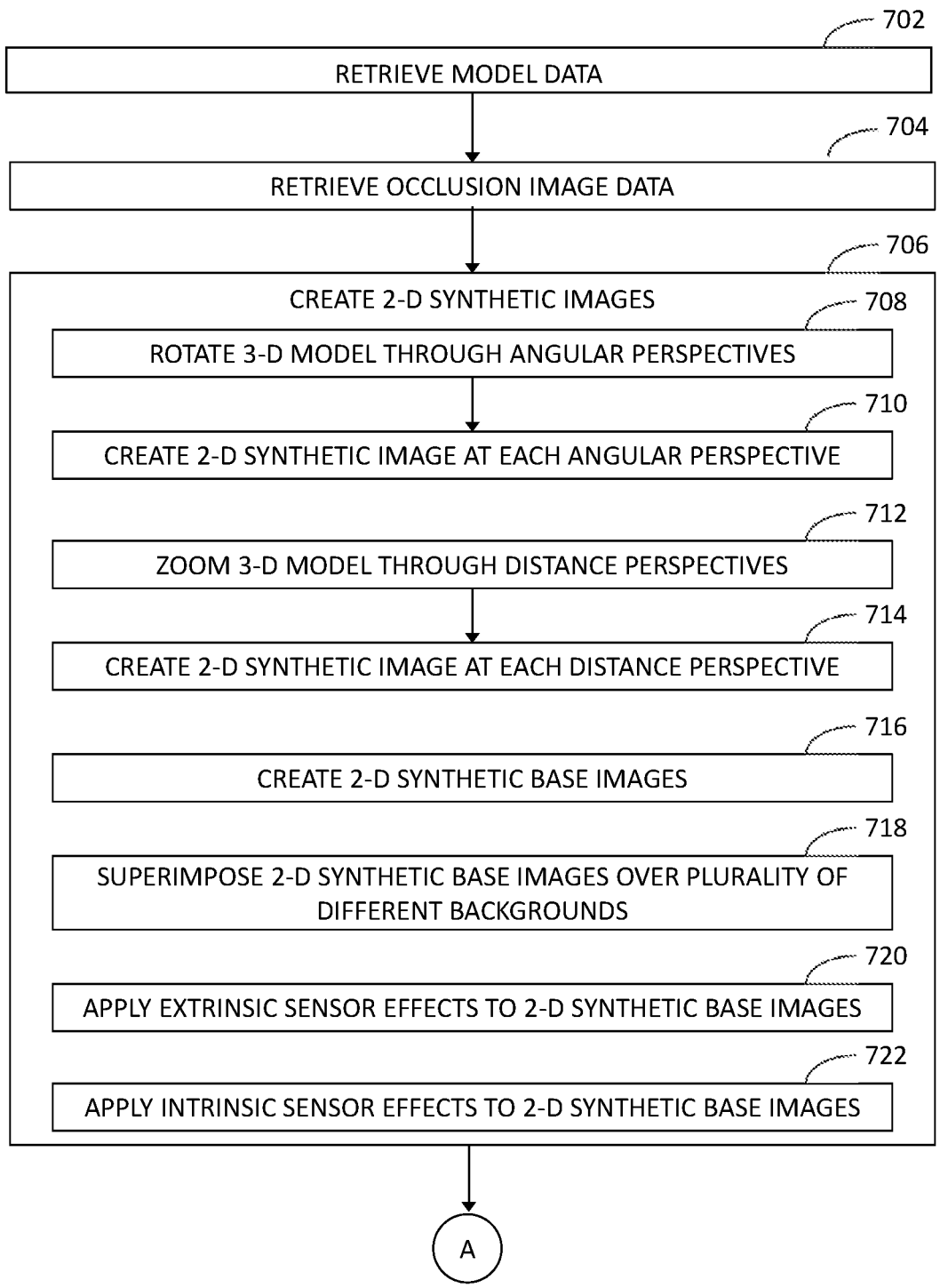
FIG. 7A is a flow diagram of an example of a method of generating a set of training images, such as the example sets shown in FIG. 2A and FIG. 2B, from a three-dimensional model of a target object, such as the three-dimensional models shown in FIG. 1A and FIG. 1B, using a computing system such as the one shown in FIG. 3 in accordance with an embodiment.
Figure 7B:
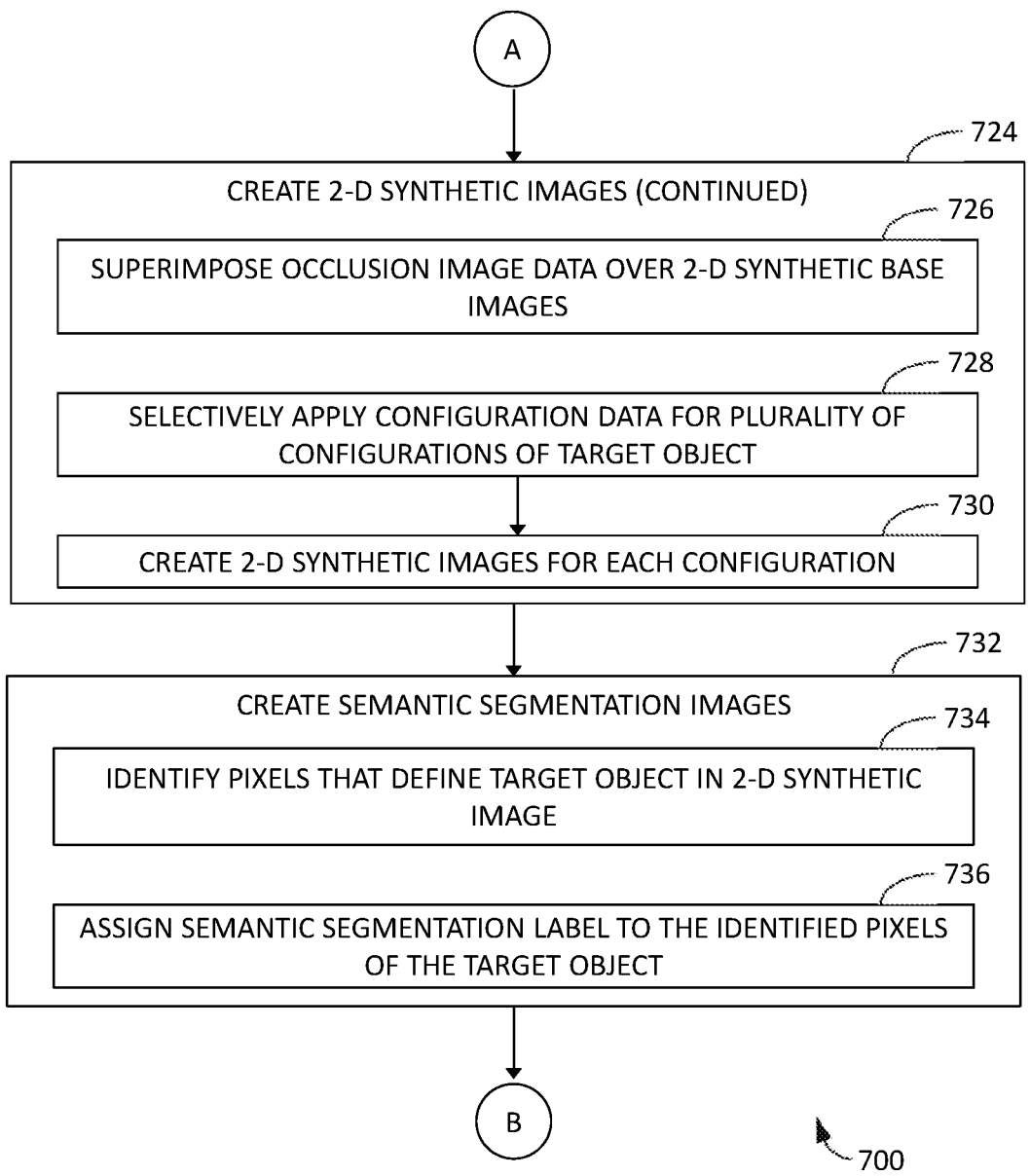
FIG. 7B is a continuation of the flow diagram of FIG. 7A in accordance with an embodiment.
Figure 7C:
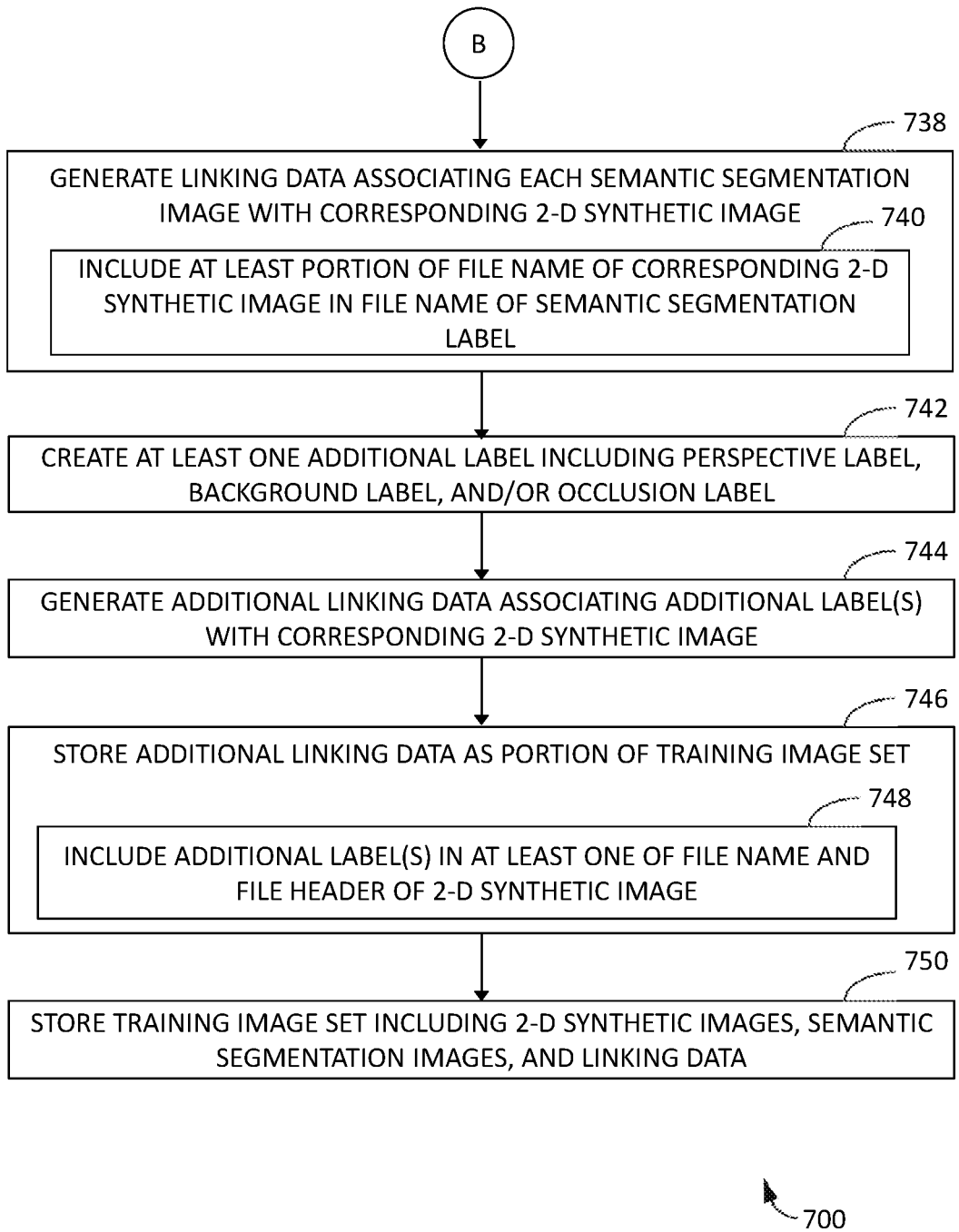
FIG. 7C is a continuation of the flow diagram of FIGS. 7A and 7B in accordance with an embodiment.

FIG. 7A is a flow diagram of an example method 700 for generating a training image set, such as training image set 350. As described above, method 700 is implemented on a computing system including at least one processor in communication with at least one memory device, such as computing system 300 including at least one processor 302 in communication with at least one memory device 304. FIGS. 7B and 7C are continuations of the flow diagram of FIG. 7A.

In the example, method 700 includes retrieving 702, from the at least one memory device 304, model data 308 corresponding to a three-dimensional (3-D) model of target object 100. In some examples, method 700 also includes retrieving 704, from the at least one memory device 304, occlusion image data 450 corresponding to occluding object 452.

In the example, method 700 also includes creating 706 plurality of 2-D synthetic images 340 from model data 308. The plurality of 2-D synthetic images 340 includes a plurality of views 240 of the 3-D model.

In some examples, the plurality of views 240 includes a plurality of angular perspectives 242, and the step of creating 706 2-D synthetic images 340 includes rotating 708 the 3-D model through plurality of angular perspectives 242 and creating 710 one of the 2-D synthetic images 340 at each of the plurality of angular perspectives 242. In certain examples, the plurality of views 240 further includes a plurality of distance perspectives 244, and the step of creating 706 2-D synthetic images 340 includes zooming 712 the 3-D model through the plurality of distance perspectives 244 and creating 714 one of the 2-D synthetic images 340 at each of the plurality of angular perspectives 242 for each of the distance perspectives 244.

In some examples, the step of creating 706 2-D synthetic images 340 includes creating 716 a plurality of 2-D synthetic base images 400 and/or 500 each corresponding to one of the views 240 of the 3-D model. In certain examples, the step of creating 706 plurality of 2-D synthetic images 340 further includes superimposing 718 the 2-D synthetic base images 340 over plurality of different backgrounds 504. Additionally or alternatively, the step of creating 706 plurality of 2-D synthetic images 340 further includes applying 720 extrinsic sensor effects to the 2-D synthetic base images 400 or 500. Additionally or alternatively, the step of creating 706 plurality of 2-D synthetic images 340 further includes applying 722 intrinsic sensor effects to the 2-D synthetic base images 400 or 500. Additionally or alternatively, the step of creating 706 plurality of 2-D synthetic images 340 includes superimposing 726 occlusion image data 450 over each of the 2-D synthetic base images 340.

In certain examples, target object 100 is presentable in a plurality of configurations, such as by including elements 110 that are configurable, and model data 308 includes configuration data 314 representative of each of the configurations. The step of creating 706 plurality of 2-D synthetic images 340 includes selectively applying 728, to the 3-D model, the configuration data 314 for each of the configurations, and creating 730 the plurality of 2-D synthetic images 340 at each of the plurality of views for each of the configurations.

In the example, method 700 also includes creating 732 a plurality of semantic segmentation images 352, including steps of identifying 734 a plurality of pixels 342 that define target object 100 in the 2-D synthetic images 340, and assigning 736 a semantic segmentation label 202, such as a preselected color, to the identified pixels 342 of the target object.

In the example, method 700 further includes generating 738 linking data 354 associating each of the semantic segmentation images 352 with a corresponding one of the 2-D synthetic images 340. In some examples, the step of generating 738 linking data 354 includes including 740 at least a portion of a file name of the corresponding 2-D synthetic image 340 in a file name of the semantic segmentation image 352. Additionally or alternatively, the step of generating 738 linking data 354 includes including such linking information in the respective file headers or other metadata of the corresponding 2-D synthetic image 340 and semantic segmentation image 352.

In certain examples, method 700 also includes, for at least one of the 2-D synthetic images 340, creating 742 at least one additional label including at least one of a perspective label, a background label, and an occlusion label, generating 744 additional linking data associating the at least one additional label with the corresponding at least one 2-D synthetic image 340, and storing 746 the additional linking data as a portion of training image set 350. In some examples, the step of storing 746 the additional linking data includes including 748 the at least one additional label in at least one of a file name and a file header of the at least one 2-D synthetic image 340. Additionally or alternatively, the step of storing 746 the additional linking data includes including such linking information in the respective file headers or other metadata of the corresponding at least one 2-D synthetic image 340 and/or semantic segmentation image 352.

In the example, method 700 also includes storing 750, for example in the at least one memory device 304, training image set 350 including 2-D synthetic images 340, semantic segmentation images 352, and linking data 354.

The above described examples of computer-implemented methods and systems for generating training image sets for a target object make use of 2-D synthetic images created from views of a computer model of the target object. The examples include identifying a plurality of boundary pixels in the 2-D synthetic image that define a perimeter of the target object in the 2-D synthetic image, automatically building a semantic segmentation image for the 2-D synthetic image from the boundary pixels, and generating linking data associating the semantic segmentation image with the corresponding 2-D synthetic image. The examples further include storing the training image set, including the 2-D synthetic images, the semantic segmentation images, and the linking data. In other words, the 2-D synthetic images are used as the native images stored as part of the training image set. In some examples, at least one of occluding image data, extrinsic sensor effects, intrinsic sensor effects, and varying background imagery is added to the 2-D synthetic images to create more robust training image sets.

Example technical effects of the methods, systems, and apparatus described herein include at least one of: (a) high-speed, automated generation of semantic segmentation images for training image sets; (b) generation of semantic segmentation images that are objectively accurate on a pixel-by-pixel basis; (c) generation of a set of training images of a target object under a variety of environmental conditions without any need to wait for or rely on physical scene adjustments; and (d) simulation of a variety of extrinsic and/or intrinsic sensor effects in computer-generated semantic segmentation images without need for any physical camera and/or physical scene adjustments.

The systems and methods described herein are not limited to the specific examples described herein, but rather, components of the systems and/or steps of the methods may be utilized independently and separately from other components and/or steps described herein.

As used herein, an element or step recited in the singular and proceeded with the word "a" or "an" should be understood as not excluding plural elements or steps unless such exclusion is explicitly recited. Furthermore, references to "one example" of the present disclosure or "an example" are not intended to be interpreted as excluding the existence of additional examples that also incorporate the recited features.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for generating a training image set, the method implemented on a computing system comprising at least one processor in communication with at least one memory device, the method comprising using the at least one processor to:
    retrieve, from the at least one memory device, model data corresponding to a three-dimensional (3-D) model of a target object;
    create a plurality of two-dimensional (2-D) synthetic images from the model data, the 2-D synthetic images including a plurality of views of the 3-D model;
    create a plurality of semantic segmentation images by:
        identifying a plurality of pixels that define the target object in the 2-D synthetic images; and
        assigning a semantic segmentation label to the identified pixels of the target object;
    generate linking data associating each of the semantic segmentation images with a corresponding one of the 2-D synthetic images; and
    store the training image set including the 2-D synthetic images, the semantic segmentation images, and the linking data.

2. The method according to claim 1, wherein the plurality of views includes a plurality of angular perspectives, and wherein creating the plurality of 2-D synthetic images comprises using the at least one processor to:
    rotate the 3-D model through the plurality of angular perspectives; and
    create one of the 2-D synthetic images at each of the plurality of angular perspectives.

3. The method according to claim 2, wherein the plurality of views further includes a plurality of distance perspectives, the method further comprising using the at least one processor to create the plurality of 2-D synthetic images by:
    zooming the 3-D model through the plurality of distance perspectives; and
    creating one of the 2-D synthetic images at each of the plurality of angular perspectives for each of the distance perspectives.

4. The method according to claim 1, wherein the target object is presentable in a plurality of configurations and the model data includes configuration data representative of each of the configurations, and wherein using the at least one processor to create the plurality of 2-D synthetic images includes:
    selectively applying, to the 3-D model, the configuration data for each of the configurations; and
    creating the plurality of 2-D synthetic images at each of the plurality of views for each of the configurations.

5. The method according to claim 1, further comprising using the at least one processor to create the plurality of 2-D synthetic images includes:
    creating a plurality of 2-D synthetic base images each corresponding to one of the views of the 3-D model; and
    superimposing the 2-D synthetic base images over a plurality of different backgrounds.

6. The method according to claim 1, further comprising:
    retrieving, from the at least one memory device, occlusion image data corresponding to an occluding object, wherein creating the plurality of 2-D synthetic images includes:
        creating a plurality of 2-D synthetic base images each corresponding to one of the views of the 3-D model; and
        superimposing the occlusion image data over each of the 2-D synthetic base images.

7. The method according to claim 1, wherein using the at least one processor to create the plurality of 2-D synthetic images includes:
creating a plurality of 2-D synthetic base images each corresponding to one of the views of the 3-D model; and
applying at least one of extrinsic sensor effects and intrinsic sensor effects to the 2-D synthetic base images.

8. The method according to claim 1, further comprising using the at least one processor to, for at least one of the 2-D synthetic images:
create an additional label including at least one of:
a perspective label corresponding to a perspective of the corresponding one of the views of the 3-D model used to create the at least one 2-D synthetic image;
a background label corresponding to one of a plurality of backgrounds used to create the at least one 2-D synthetic image; and
an occlusion label corresponding to an occluding object for which occlusion image data is included in the at least one 2-D synthetic image;
generate additional linking data associating the additional label with the corresponding at least one 2-D synthetic image; and
store the additional linking data as a portion of the training image set.

9. The method according to claim 8, wherein the additional linking data comprises an inclusion of the additional label in at least one of a file name and a file header of the at least one 2-D synthetic image.

10. The method according to claim 1, further comprising using the at least one processor to generate the linking data by including at least a portion of a file name of the corresponding 2-D synthetic image in at least one of a file name and a file header of a file containing the semantic segmentation image.

11. A computing system for generating a training image set, the computing system comprising at least one processor in communication with at least one memory device, wherein the at least one processor is configured to:
retrieve, from the at least one memory device, model data corresponding to a three-dimensional (3-D) model of a target object;
create a plurality of two-dimensional (2-D) synthetic images from the model data, the 2-D synthetic images including a plurality of views of the 3-D model;
create a plurality of semantic segmentation images by:
identifying a plurality of pixels that define the target object in the 2-D synthetic images; and
assigning a semantic segmentation label to the identified pixels of the target object;
generate linking data associating each of the semantic segmentation images with a corresponding one of the 2-D synthetic images; and
store the training image set including the 2-D synthetic images, the semantic segmentation images, and the linking data.

12. The computing system according to claim 11, wherein the plurality of views includes a plurality of angular perspectives, and wherein the at least one processor is further configured to create the plurality of 2-D synthetic images by:
rotating the 3-D model through the plurality of angular perspectives; and
creating one of the 2-D synthetic images at each of the plurality of angular perspectives.

13. The computing system according to claim 12, wherein the plurality of views further includes a plurality of distance perspectives, and wherein the at least one processor is further configured to create the plurality of 2-D synthetic images by:
zooming the 3-D model through the plurality of distance perspectives; and
creating one of the 2-D synthetic images at each of the plurality of angular perspectives for each of the distance perspectives.

14. The computing system according to claim 11, wherein the target object is presentable in a plurality of configurations and the model data includes configuration data representative of each of the configurations, and wherein the at least one processor is further configured to create the plurality of 2-D synthetic images at least in part by:
selectively applying, to the 3-D model, the configuration data for each of the configurations; and
creating the plurality of 2-D synthetic images at each of the plurality of views for each of the configurations.

15. The computing system according to claim 11, wherein the at least one processor is further configured to create the plurality of 2-D synthetic images at least in part by:
creating a plurality of 2-D synthetic base images each corresponding to one of the views of the 3-D model; and
superimposing the 2-D synthetic base images over a plurality of different backgrounds.

16. The computing system according to claim 11, wherein the at least one processor is further configured to retrieve, from the at least one memory device, occlusion image data corresponding to an occluding object, and wherein the processor is further configured to create the plurality of 2-D synthetic images at least in part by:
creating a plurality of 2-D synthetic base images each corresponding to one of the views of the 3-D model; and
superimposing the occlusion image data over each of the 2-D synthetic base images.

17. The computing system according to claim 11, wherein the at least one processor is further configured to create the plurality of 2-D synthetic images at least in part by:
creating a plurality of 2-D synthetic base images each corresponding to one of the views of the 3-D model; and
applying at least one of extrinsic sensor effects and intrinsic sensor effects to the 2-D synthetic base images.

18. The computing system according to claim 11, wherein the at least one processor is further configured to, for at least one of the 2-D synthetic images:
create an additional label including at least one of:
a perspective label corresponding to a perspective of the corresponding one of the views of the 3-D model used to create the at least one 2-D synthetic image;
a background label corresponding to one of a plurality of backgrounds used to create the at least one 2-D synthetic image; and
an occlusion label corresponding to an occluding object for which occlusion image data is included in the at least one 2-D synthetic image;
generate additional linking data associating the additional label with the corresponding at least one 2-D synthetic image; and
store the additional linking data as a portion of the training image set.

19. The computing system according to claim 11, wherein the at least one processor is further configured to generate the linking data by including at least a portion of a file name of the corresponding at least one 2-D synthetic image in at least one of a file name and a file header of a file containing the semantic segmentation image.

20. A non-transitory computer-readable storage medium having computer-executable instructions embodied thereon for generating a training image set, wherein when executed by at least one processor in communication with at least one memory device, the computer-executable instructions cause the at least one processor to:
- retrieve, from the at least one memory device, model data corresponding to a three-dimensional (3-D) model of a target object;
- create a plurality of two-dimensional (2-D) synthetic images from the model data, the 2-D synthetic images including a plurality of views of the 3-D model;
- create a plurality of semantic segmentation images by:
  - identifying a plurality of pixels that define the target object in the 2-D synthetic images; and
  - assigning a semantic segmentation label to the identified pixels of the target object;
- generate linking data associating each of the semantic segmentation images with a corresponding one of the 2-D synthetic images; and
- store the training image set including the 2-D synthetic images, the semantic segmentation images, and the linking data.

* * * * *